(12) United States Patent
Camiener et al.

(10) Patent No.: US 6,638,397 B1
(45) Date of Patent: Oct. 28, 2003

(54) SIMPLIFIED AUTOMATED DISTILLATION SYSTEM FOR RECOVERING A SOLVENT FROM A LIQUID MIXTURE

(75) Inventors: Alan M. Camiener, Lathrup Village, MI (US); Gerald W. Camiener, Naples, FL (US)

(73) Assignee: CBG Biotech, Ltd., Naples, FL (US)

( * ) Notice: Subject to any disclaimer, the term of this patent is extended or adjusted under 35 U.S.C. 154(b) by 285 days.

(21) Appl. No.: 08/567,771

(22) Filed: Dec. 5, 1995

(51) Int. Cl.[7] .............................. B01D 3/00; B01D 3/14
(52) U.S. Cl. .................... 202/161; 202/185.1; 422/198; 422/234
(58) Field of Search .................... 165/111; 202/159, 202/160, 161, 185.1

(56) References Cited

U.S. PATENT DOCUMENTS

| | | | | |
|---|---|---|---|---|
| 3,629,075 A | * | 12/1971 | Gutbier | 202/185.1 |
| 4,575,403 A | * | 3/1986 | Rosenhouse et al. | 202/159 |
| 4,778,566 A | * | 10/1988 | Vinz | 202/159 |
| 4,889,600 A | * | 12/1989 | Meier et al. | 202/160 |
| 4,894,145 A | * | 1/1990 | Jensen | 202/160 |
| 5,296,103 A | * | 3/1994 | Masetto | 202/160 |
| 5,415,224 A | * | 5/1995 | Koch et al. | 165/111 |

* cited by examiner

*Primary Examiner*—Glenn Caldarola
*Assistant Examiner*—Alexa A. Doroshenk
(74) *Attorney, Agent, or Firm*—Foley & Lardner

(57) ABSTRACT

A system is described for recovering a purified distillable component from a starting mixture utilizing a transition tank to receive a transition mixture distilled from a starting mixture, which is returned to the system for further distillation. The system includes a condenser which features an annular tube having cooling fins arranged inside and outside its annular region to improve its cooling efficiency, and a reflux column which features a flow distributor and a flow centralizer to improve mixing of the rising vapors with the descending liquid. The system also includes a temperature sensor located between the reflux column and the condenser for supplying temperature measurements used in the automatic, operator-less control of the system.

10 Claims, 7 Drawing Sheets

SIMPLIFIED AUTOMATED DISTILLATION SYSTEM FOR RECOVERING A SOLVENT FROM A LIQUID MIXTURE

BACKGROUND OF THE INVENTION

1. Field of the Invention

The present invention relates to a distillation system and, more particularly, to a simplified and automated distillation system which is capable of recovering a purified solvent from a solvent mixture.

2. Description of the Related Art

Distillation is widely used, both in the laboratory and on a large industrial scale, to separate boilable liquids (solvents) present in a liquid mixture. During distillation, the liquid mixture is at least partially vaporized and collected separately from the residue. For the most part, the effectiveness of separation by distillation is determined by differences in the boiling points of the solvents which make up the liquid mixture. In other words, it is more difficult to separate by distillation, liquid mixtures having solvents with close boiling points.

Most distillation systems have several common features. The common features are illustrated schematically in embodiments of a laboratory-type distillation system, FIG. 5, and a batch-type distillation system, FIG. 6. The common features are:

1. A heated area 510, 610 where volatile components are evaporated to form vapors.
2. A reflux section 520, 620 where vapors are "washed" by cooler liquid returning to the evaporation area.
3. A condenser section 530, 630 where the "washed" vapors are condensed to form a condensate.
4. Single or multiple discharge ports 540, 640 for the collection and/or recirculation of the condensate.

Distillation is a very old technology, and was developed for the distillation of alcohol spirits, perfumes, and oils. Today, the distillation equipment is relatively more sophisticated, and even a small laboratory-type unit has the capability to provide high-purity separations of closely-boiling solvents. The modern equipment achieves such high-purity separations by a variety of techniques including spinning band techniques, the use of many theoretical plates (stages), high reflux ratios, multiple collection ports, and water-cooled spirally-arranged condenser tubes.

For simple distillation tasks, however, such high-performance equipment has many disadvantages. For example:

1. It can be very expensive.
2. It requires careful attention during operation.
3. An experienced operator is generally required.
4. It often contains glass and other breakable parts that can cause hazardous conditions should they break or leak.
5. It requires frequent maintenance and parts replacement.
6. Special work areas and facilities (water and 220 volt outlets, hoods, etc.) normally are required.
7. Operating cycles can be quite long.

Moreover, in many small clinical and research laboratories, cleaning facilities, and machine shops, only relatively small amounts of one or two solvents are used on a regular basis, and there thus has been little incentive to recycle solvents. The relatively high costs of the modern distillation equipment, its operation, and the required manpower and working space have discouraged widespread use.

At the same time, however, there have been mounting pressures for solvent recycling both for cost and environmental reasons. Substantial costs are associated with the purchase and disposal of the solvents. Therefore, recycling the solvents would generate considerable cost savings, and would have beneficial environmental effects.

SUMMARY OF THE INVENTION

An object of the invention is to provide a distillation system which is simple in structure and operation.

Another object of the invention is to provide a simplified and an automated distillation system which is capable of recovering a purified distillable component from a starting mixture having relatively close boiling points.

Still another object of the invention is to provide a simplified and an automated distillation system which is small, operator-independent, inexpensive, safe, durable, virtually maintenance-free, requires no special facilities, and is usable in virtually any location.

Still another object of the invention is to provide a simplified method for automatically recovering a purified distillable component from a starting mixture having relatively close boiling points.

The above and other objects of the invention are accomplished with a distillation system whose design resulted, in part, from the following simplifying specifications for its operation:

1. In a preferred embodiment, one volatile component can be purified in a single distillation cycle.
2. A minimum acceptable purity of the recovered distillable component is specified rather than just trying to obtain as high purity as possible. The specified purity is that which is needed for the particular application.
3. Distillable component yields are dependent upon the purity specification. The total collected fraction will contain some portions which have less than the specified purity and some portions which have more than the specified purity, but, on the average, meets the purity specification.

The distillation system according to the invention includes a transition tank. When a starting mixture including at least distillable component is distilled batch-wise, there exists a separation problem at the point when one fraction is ending and the next fraction is beginning. To minimize the mixing of one distillable component with another distillable component or with waste component(s) from the starting mixture during this transition, rather sophisticated techniques are used conventionally, including the use of spinning band, vacuum, large number of theoretical plates, high reflux ratios, and multiple collection ports.

The transition tank eliminates the need to separate these transition mixtures into their separate components. Instead, these mixtures are simply put aside and stored in the transition tank until the current distillation cycle is completed. The transition tank is then drained into the evaporation tank at or prior to the beginning of the next distillation cycle. Volume-wise, these transition mixtures are usually not particularly large. At two to three theoretical plates and a specified purity level of greater than 99.5%, they tend to be about 10–25% of the starting volume. At five to ten theoretical plates and a specified purity level greater than 99.5%, the transition mixtures tend to be about 1–5% of the starting volume.

A first advantage of the distillation system according to the invention is that high purities can be obtained with relatively small numbers of theoretical plates. During the distillation of a distillable component, the purity of the collected product is highest at around the midpoint of the collection cycle, and it decreases toward both ends of the cycle (i.e., beginning and end). If a minimum acceptable purity is established for this middle cut, it then is possible to determine the minimum number of theoretical plates that are needed to produce the minimum specified purity. For example, in a laboratory environment in which a purity of 99.0% can be more than adequate, only two to three theoretical plates are required with the distillation system according to the invention.

With the distillation system according to the invention, simply by increasing the number of theoretical plates from two or three, the yields (amounts) of the purified distillable component at a specified purity are increased. As a corollary, if a desired yield is specified, then the minimum number of theoretical plates which are required for a particular distillation run can be determined. By reducing the number of plates, equipment size, run times, cooling and the like are minimized. For the distillation system according to the invention, preferred results are obtained most often with theoretical plates numbering from one to about twenty. By definition, "one plate" consists of simply boiling and condensing a solution with no refluxing.

As noted earlier, the end portions (end cuts) of each fraction that do not meet the minimum purity specifications are simply put aside in the transition tank and reprocessed in the next run. The point at which each cut is made is controlled by the temperature sensors which, in turn, control the different reflux and collection solenoid valves. The closer that the temperature switch point is to the actual boiling point of a distillable component (both below and above it), the smaller the yield. The actual temperature switch points that are used for a particular distillable component are those that provide the specified purity with the maximum yield.

A second advantage of the distillation system according to the invention is that good purities and yields can be obtained at relatively low ref lux ratio numbers. The reflux ratio is defined as the volume of condensate that is recycled back through the reflux column divided by the volume of condensate that is diverted for collection. This can be thought of as being a measure of the amount of "washing" given to vapors coming up from the evaporation tank. Higher ratios indicate more "washing" which, in turn, results in higher levels of purity. The disadvantages of high reflux ratios are that bigger equipment is needed; product is produced more slowly; run times are increased; the size of heaters and the usage of electricity are increased; and cooling requirements are increased, often substantially.

Because of the above disadvantages of using high reflux ratios, it is an advantage to have reflux ratios that are as low as possible. Thus, in the distillation system according to the invention, once the minimum number of theoretical stages is set, the reflux ratios can be reduced to a point where the amount of recirculating condensate becomes just sufficient to meet the minimum specified purity. For the distillation system according to the invention, the preferred ratios range from about 0 to about 5. By definition, a distillation unit with only one theoretical plate has a reflux ratio of zero. In practice, the reflux ratios can be controlled in the system simply by controlling the size of the orifice in the partial reflux solenoid valve (see element 130 of FIG. 1).

The reduction in reflux ratio thus results in a reduction in the size of the equipment, as demonstrated by the present invention. The reduction in size permits the use of smaller heaters and ordinary 110 volt wall current, and a change from a water-cooled system to an air-cooled system. Furthermore, operating times are reduced.

A third advantage of the distillation system according to the invention is that an automated operator-less system can be constructed. The system requires only temperature sensors, solenoid valves, and optional timers, if the distillation is limited to the purification of the desired components to pre-specified purity levels. In such systems, the components in a liquid mixture are collected into at least two fractions: a purified distillable component fraction and a waste fraction. In Example 1 (below), the components are collected into one of three fractions: a lower boiling waste fraction, a purified distillable component fraction, and a higher boiling waste fraction. In cases where the desired distillable component is the highest boiling component, a third fraction could still exist and it would consist of a relatively non-volatile component like suspended solids. In other cases where the desired distillable component is the lowest boiling component in a mixture (see Examples 2 and 3 below), only two fractions are obtained because there is no lower boiling fraction. With more complex mixtures, it is possible to obtain multiple purified component fractions and/or multiple waste fractions.

It is to be noted that the contents of the transition tank are not a final or ultimate fraction, and hence, they were not included in the above discussions, and should not be considered to be a separate fraction.

The automated system replaces the much more complex systems which employ intricate computer controlled operations, continuous measuring systems, variable heating programs, trained operators, and the like.

A fourth advantage of the distillation system according to the invention is that ordinary atmospheric air pressures can be used for most of the practical and commonplace types of separations. Reduced pressure (vacuum) or greater than atmospheric pressure conditions can be used, if desired, but such conditions can require complicated and expensive equipment which is capable of maintaining these vacuums or pressure conditions. A preferred embodiment of the present invention therefore operates at ordinary atmospheric pressure.

A fifth advantage of the distillation system according to the invention is that small "hold-up" volumes are not always required for good separations. "Hold-up" volume refers to the volume of distillable component(s) retained in the reflux and condenser portions of the system during the distillation. The reason for this simplification is the existence of the transition tank which allows "hold-up" volumes of distillable component to be reprocessed in the next run. As a result, the reflux column is much simplified in the distillation system according to the invention.

The distillation system according to the invention also includes thermal sensors, which may be thermal switches, thermocouples, or the like, optimally located between the upper one-third of the reflux column and the beginning of the condenser unit.

By comparison, traditional multi-product laboratory-type distilling equipment can employ:

1. A single temperature read-out device (e.g., a thermometer) which usually is located in the evaporation tank, and whose function is to provide identification information to the operator as to which component is being boiled off at a particular point in time.
2. A fraction collection system (manual or automatic) that is dependent upon a monitoring system (physical and/or chemical measurements) to "tell" the collection system when to change to a different collection port, or to a different collection container.

The thermal sensor located between the upper one-third of the reflux column and the beginning of the condenser unit, replaces the monitoring sensors of the above-described more-complicated monitoring systems. In the distillation system according to the invention, the thermal sensor is, in a sense, a measuring sensor. The temperature in this section of the distillation system, at any one time, is a reflection (indirect measurement) of the components that are present. Thus, by adjusting the temperature set points of the thermal sensor, the purity and yield of the collected component(s) can be controlled.

The distillation system according to the invention also includes additional thermal sensors located at other positions, but these are used for different purposes. For example, one of the sensors in the evaporation tank is used to turn off the external heater, and the sensor at the top of the condenser unit is used for safety purposes.

The distillation system according to the invention further includes a reflux column and a condenser tube, both of special designs. The reflux column has a plurality of flow distributors and flow centralizers spaced axially within the column housing. Irregularly-shaped solids, e.g., roofing nails, are interdisposed in the gaps between the axial positions of the distributors and the flow centralizers. The special design improves "washing" and thus reduces the overall height of the reflux column.

The condenser unit has an inverted design, which allows for a very rapid condensation of vapors even though the condenser has a relatively small and compact shape. This inverted design of the condenser tube has several important features:

1. It reduces the "dead" inner volume of the condenser unit so that vapors are always quite close to the cooling surfaces (both inner and outer). The helical inner fins also have the effect of forcing the vapors upward and toward the outer wall, which has the greatest cooling capability. The fins, in themselves, provide additional cooling surfaces while allowing for good drainage of condensate.

2. This design allows for the use of condensing units with large cooling surface areas which can be a function of large diameters since surface area equals pi times diameter times length. In the absence of an inverted section, a large diameter tube would have a large "dead" inner volume that would have poor cooling properties.

3. The inverted structure provides two large cooling surfaces with a relatively low manufacturing cost and a greater ease of construction. More complex and convoluted cooling structures have been described (e.g., helical condensing tubes), but these structures are much more difficult to make and they cost proportionately more.

Additional objects and advantages of the invention will be set forth in the description which follows. The objects and advantages of the invention may be realized and obtained by means of the instrumentalities and combinations particularly pointed out in the appended claims.

BRIEF DESCRIPTION OF THE DRAWINGS

The invention is described in detail herein with reference to the drawings in which.

DETAILED DESCRIPTION OF THE PREFERRED EMBODIMENT

Figure 1:
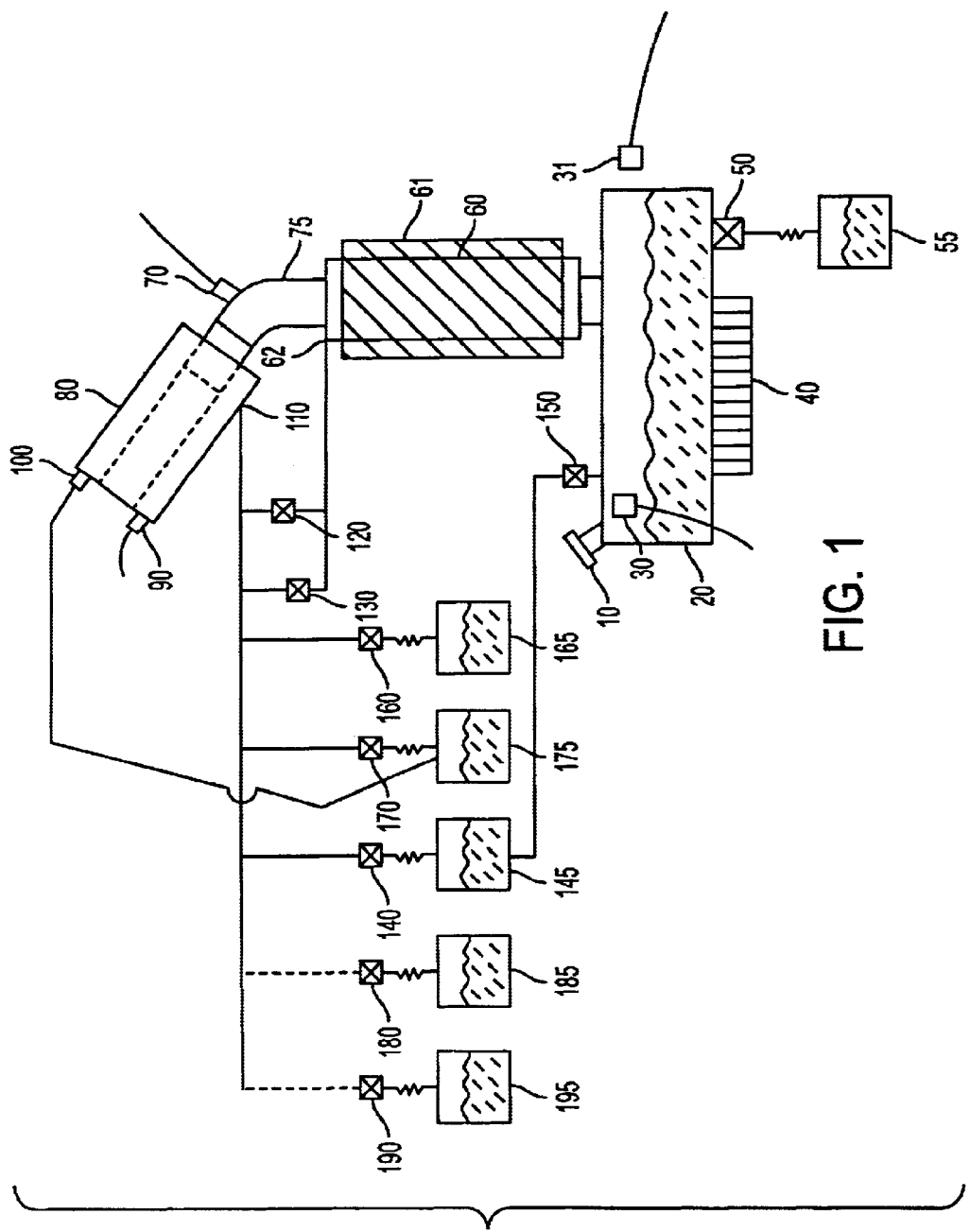
FIG. 1 is a schematic illustration of a distillation system according to the invention.

In one embodiment, the invention relates to a system for recovering through at least one distillation cycle at least one purified distillable component from a starting mixture, wherein the system comprises a transition tank receiving at least one transition mixture which has been distilled from said starting mixture during a distillation cycle and is to be supplied to said system as part of the starting mixture used in a next distillation cycle.

The starting mixture typically includes at least one waste component having a different boiling point from the at least one distillable component to be purified, although the boiling points of the components in the starting mixture can be relatively close to each other. Preferably, the distillable component to be purified is a solvent.

Preferably, at least one transition mixture is collected during a transition period corresponding to a temperature range occurring before or after a boiling point of said at least one distillable component to be purified. The transition mixture includes the distillable component to be purified in a partially purified state along with part of either one of the waste component(s) of the starting mixture, or a second distillable component to be purified.

The system preferably further includes an evaporation tank holding said starting mixture, said evaporation tank connected with said transition tank to receive said transition mixture therefrom;

a heater to supply heat to said evaporation tank, said heat vaporizing said starting mixture;

a condenser receiving vapors of said starting mixture and condensing said vapors to a liquid state, said condenser connected with said transition tank to supply said transition mixture thereto; and a reflux column arranged between said evaporation tank and said condenser, said reflux column including a vapor inlet through which said vapors are received from said evaporation tank, a vapor outlet through which said vapors are supplied to said condenser, and a liquid inlet through which condensed vapors from the condenser are used to reflux (wash) incoming vapors from the evaporation tank;

wherein said transition mixture is a mixture including said at least one distillable component which results from vapors of the starting mixture that are vaporized from said evaporation tank and condensed in said condenser and collected during a transition period corresponding to a predetermined temperature range before and/or after a boiling point of said at least one distillable component to be purified.

The system further preferably includes at least one waste tank connected to said condenser or said evaporation tank;

at least one purified distillable component collection tank connected to said condenser;

at least one temperature sensor disposed between said reflux column and said condenser, said sensor monitoring a temperature of said vapors traveling from said reflux column to said condenser; and a plurality of valves including a waste tank valve controlling flow from said condenser to said waste tank or from said evaporation tank to said waste tank, a purified distillable component collection valve controlling flow from said condenser to said purified distillable component collection tank, a first transition valve controlling flow from said condenser to said transition tank, a second transition valve controlling flow from said transition tank to said evaporation tank, a full reflux valve controlling flow from said condenser to said reflux inlet of said reflux column, a partial reflux valve controlling flow from said condenser to said reflux inlet of said reflux column, wherein said plurality of valves operate in response to the temperature sensed by said at least one temperature sensor and said partial reflux valve is opened simultaneously with one of said waste tank valve or with said purified distillable component collection valve.

In another embodiment, the present invention is directed to a distillation system comprising:

a heating tank holding and vaporizing a starting mixture;

a condenser receiving vapors of said starting mixture and condensing said vapors to a condensate, said condenser including a base opening through which said vapors are supplied and an outer wall section being in fluid communication with said base opening which defines an inner receiving area for the vapors after entering through said base opening, said inner receiving area being at least partially blocked with an inner wall section which forces the vapors to travel in the receiving area between the outer wall section and the inner wall section; and a purified distillable component tank collecting therein the condensate from said condenser.

Preferably, the system of this embodiment further comprises inner fins arranged along the outer and/or inner wall sections that contact the vapors. Preferably, the inner fins are helically arranged. Preferably, the system includes at least one cooling fin disposed along an outer periphery of the outer wall section. Preferably, the inner wall section is hollow to allow cooling air to enter and cool the inner wall section. Preferably, the system includes a condensate outlet port arranged at a lowest portion of said condenser.

In another embodiment, the present invention is directed to a distillation system comprising:

a heating tank holding and vaporizing a starting mixture;

a condenser; and a reflux column through which vapors of said starting mixture are supplied to said condenser and down which liquid flows to mix with said vapors, said reflux column including at least one flow distributor having a plurality of holes to permit the liquid to flow therethrough and at least one flow centralizer having a center opening and inclined wall portions to redirect liquid flowing down walls of said reflux column toward said center opening, said reflux column further including a plurality of structures having a high surface area to volume ratio arranged asymmetrically to allow contact between ascending vapors and descending condensate.

Preferably, the structures having a high surface area to volume ratio comprise a rod attached perpendicularly at one end to a flat plate. Preferably, the rods attached perpendicularly at one end to a flat plate are nails.

In another embodiment, the present invention is directed to a distillation system comprising:

a heating tank holding and vaporizing a starting mixture;

a condenser;

a reflux column through which vapors of said starting mixture are supplied to said condenser and down which liquid flows to mix with said vapors;

a purified distillable component collection tank(s) or waste component collection tank(s) connected to said condenser to collect said at least one purified distillable component;

a temperature sensor mounted between said condenser and said reflux column which effects at least one function selected from the group consisting of degree of reflux, flow into the purified distillable component collection tank, and shut-off of the distillation system; and optionally a waste component collection tank or tanks to collect waste component(s) purified from the starting mixture.

Preferably, the reflux column further comprises a reflux inlet through which condensate is supplied from said condenser and a reflux valve controlling flow from said condenser to said reflux inlet, said reflux valve operating in response to the temperature sensed by said temperature sensor.

In another embodiment, the present invention is directed to a distillation system comprising:

a heating tank holding and vaporizing a starting mixture, said tank having a first temperature sensor measuring a temperature of vapors within said heating tank and a second temperature sensor measuring a temperature of said heating tank;

a condenser having a heat alarm sensor;

a reflux column through which vapors of said starting mixture are supplied to said condenser and down which liquid flows to mix with said vapors; and a third temperature sensor mounted between said condenser and said reflux column, wherein said first and second temperature sensors, said heat alarm sensor and said third temperature sensor provide emergency, signals, shut-off signals, and/or alarm signals.

In another embodiment, the present invention is directed to a distillation method for recovering at least one purified distillable component from a starting mixture, said method comprising the steps of:

receiving at least one transition mixture which has been distilled from said starting mixture during a distillation cycle that is collected before and/or after a boiling point of said at least one distillable component; and supplying said transition mixture to said system as part of said starting mixture for a next distillation cycle.

Preferably, the step of receiving the transition mixture occurs during a transition period corresponding to a predetermined temperature range.

In another embodiment, the present invention is directed to a distillation method for recovering at least one purified distillable component from a starting mixture, said method comprising the steps of:

(a) heating and partially vaporizing said starting mixture;

(b) monitoring a temperature of vapors;

(c) condensing the vapors of said starting mixture into condensate;

(d) refluxing the vapors of said starting mixture by recirculating all of the condensate so that the condensate contacts the vapors;

(e) when the temperature reaches a first predetermined point, recirculating only a portion of the condensate so that the portion of the condensate contacts the vapors and directing remaining portions of the condensate to a first collecting tank which collects (1) a waste component if the starting mixture contains a waste component having a lower boiling point than said at least one distillable component to be purified or (2) said at least one distillable component to be purified if the distillable component has the lowest boiling point within the starting mixture; and (f) when the temperature reaches a second predetermined point, directing all of the condensate to a transition tank, and (g) supplying said condensate from said transition tank as part of said starting mixture for a next distillation cycle.

If more than one component is to be collected from the starting mixture, then the method preferably further comprises the following additional steps:

(h) when the temperature reaches a third predetermined point, refluxing the vapors of said starting mixture by recirculating all of the condensate so that the condensate contacts the vapors;

(i) when the temperature reaches a fourth predetermined point, recirculating only a portion of the condensate so that the portion of the condensate contacts the vapors and directing remaining portions of the condensate to a second collecting tank; and (j) when the temperature reaches a fifth predetermined point, directing all of the condensate to said transition tank When the starting mixture contains more than one component to be purified, steps (h) through (j) are repeated a corresponding number of times.

FIG. 1 is a schematic illustration of a preferred embodiment of a distillation system according to the invention.

An evaporation tank 20 stores the liquid mixture which contains the distillable component for which recovery is sought. An external heater 40 supplies heat to the tank 20 and the liquid mixture contained in the tank 20. The external heater 40 is preferably electric and comprises a plurality of electrical resistance heating lines disposed on the tank 20. The amount of heat supplied by the external heater 40 is controlled by varying the electrical current through the heating lines. Evaporation of the liquid mixture varies in response to the heat supplied by the external heater 40. The vapors evaporated from the liquid mixture are directed into the reflux column 60.

Other features associated with the tank 20 are the filling tube and cap 10 and a temperature sensor 30 which measures the temperature of the vapor above the liquid mixture inside the tank 20. Another temperature sensor 31 is provided on the outside of the tank 20 for safety purposes. The temperature signals are supplied to a control unit 400 (see FIG. 4) of the distillation system. The control unit 400 shuts off the distillation system when a measured temperature reaches a certain predetermined value.

The tank 20 is also connected to a holding container 55 which is provided to collect the higher boiling waste fraction of the liquid mixture. Communication with the holding container 55 is controlled by a valve 50 disposed between the tank 20 and the holding container 55.

The reflux column 60 has a vapor inlet connected with the tank 20 and a vapor outlet connected with an elbow connector 75. Inside the column 60, there exists a temperature gradient, with temperature of the column 60 being lower at higher points of the column 60. Insulation 61 is provided around the column 60 to lessen cooling of the column 60.

As the vapor rises up the column, it begins to condense and the condensate drops back into the tank 20. Also, during refluxing portions of the cycle, condensate from the condenser are routed, in part or in full, onto the top of the reflux column 60. On the downward path, the descending liquid comes in contact with the rising vapor. As a result of the contact, the rising vapor becomes richer in the more volatile components (substances with lower boiling points) as the less volatile fractions condense out. The remaining liquid becomes more concentrated in the less volatile components. The temperature in the column also rises with time.

Figure 3:
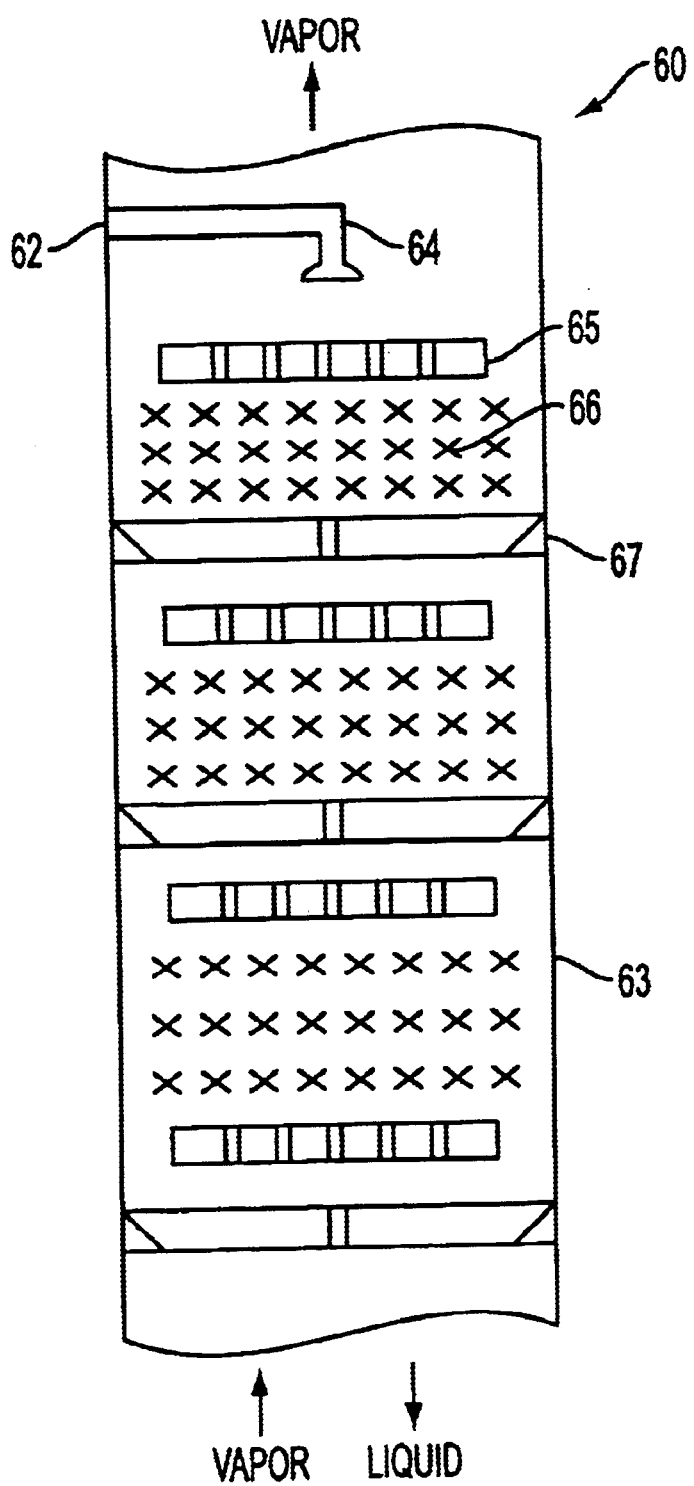
FIG. 3 is a schematic illustration of the reflux column used in the distillation system according to the invention.

The efficiency of the distilling process depends on the vapor and liquid in the column always being in intimate contact with each other. For this reason, the column 60 is packed with small objects. The small objects are preferably glass, ceramic, or metal shaped into beads, spheres, rings, small hollow cylinders, or other shapes and forms. In the preferred embodiment, the small objects are roofing nails 66 (see FIG. 3).

Another way to improve liquid-vapor contact is to assure that an adequate amount of liquid is recycled down through the column 60. In the present invention, a reflux inlet 62 is provided near the top of the column 60 for this purpose.

Vapor exits the reflux column 60 through the elbow connector 75 and enters a condenser 80 where the vapor is cooled and condensed into a condensate. A temperature sensor 70 is mounted on the elbow connector 75 to monitor the temperature of the vapor exiting the column 60 and entering the condenser 80. This temperature is measured and supplied to the control unit 400 (see FIG. 4) and is used to turn the heater 40 "on" and sometimes "off" and to selectively open and close valves 50, 120, 130, 140, 150, 160, and 170. The manner of control is described below.

The condenser structure is one of the features of the present invention and the details thereof are illustrated in FIGS. 2, 2A, 2B and 2C.

The condenser 80 is shown in an inclined position in FIG. 1, but the scope of the invention is not limited to this arrangement. In alternative embodiments, the condenser may be in any position. The condenser is shown in the inclined position in the preferred embodiment for the purpose of reducing the overall height of the distillation system.

The condenser 80 has an inner tube component 82*a* and an outer tube component 82*b*. The two components are assembled together through threads 87*a* and 87*b* provided on the inner and outer tube components 82*a* and 82*b*, respectively. The assembled unit is illustrated in FIG. 2C.

The inner tube component 82*a* is generally cylindrical and has helically arranged inner cooling fins 85 disposed on an outer periphery of its cylindrical section. Inner cooling fins 85 direct vapors toward the outer periphery of the condenser 80 and are angled to allow condensate to drain downward. The cylindrical section has an opening 88 and a solid wall portion 84 such that, when the inner tube component 82*a* is engaged with the outer tube component 82*b*, atmospheric air is permitted to flow within the inner periphery of the condenser 80 through the opening 88.

The outer tube component 82b is generally cylindrical and has plurality of outer fins 86 arranged on the outer periphery of its cylindrical section. The outer cooling fins 86 are provided for increased cooling. One of the ends of its cylindrical section is open while the other end is sealingly attached to a connecting portion 82c.

The connecting portion 82c is also a cylindrical section whose diameter is smaller than that of the outer tube component 82b. One of its ends is disposed within the cylindrical section of the outer tube component 82b while the other end is engaged with the elbow connector 75 through threads 76. The connecting portion 82c also has a plurality of openings 83 such that, when vapor enters the connecting portion 82c from the elbow connector 75, it escapes through the plurality of openings 83 into the inner periphery of the outer tube component 82b.

Figure 2:
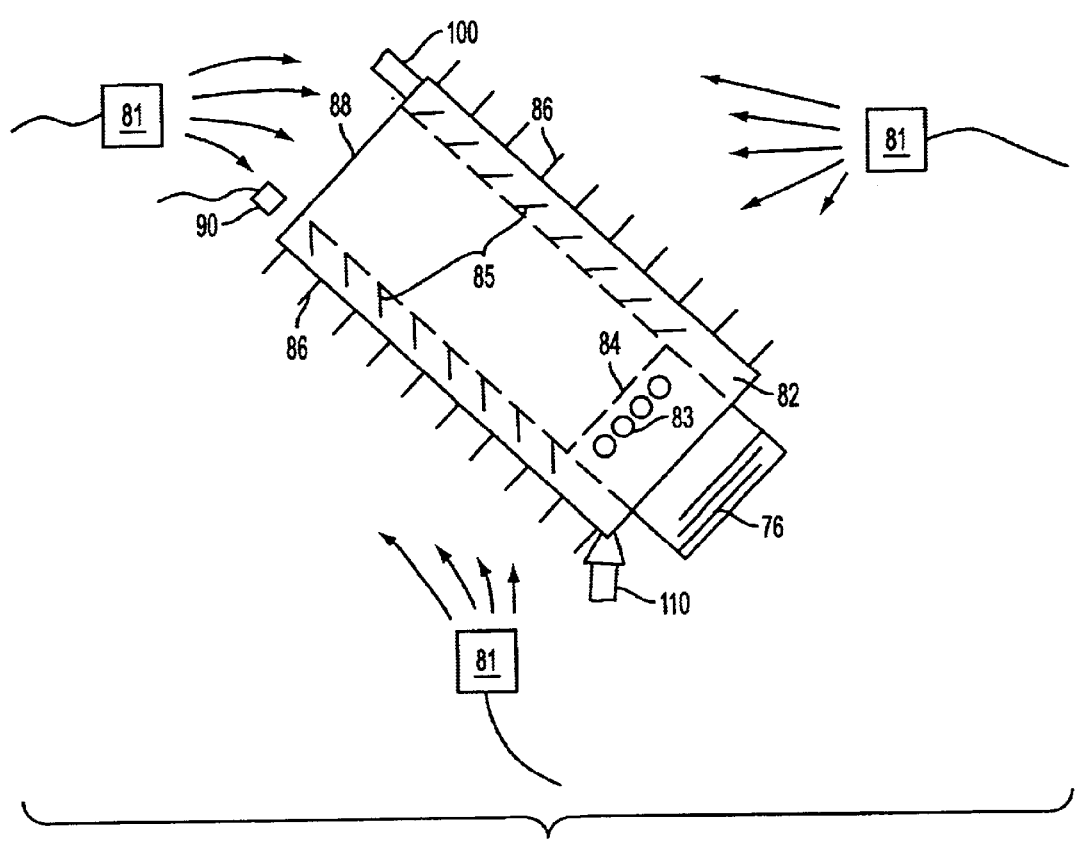
FIG. 2 is a schematic illustration of a condenser tube used in the distillation system according to the invention.
Figure 2A:
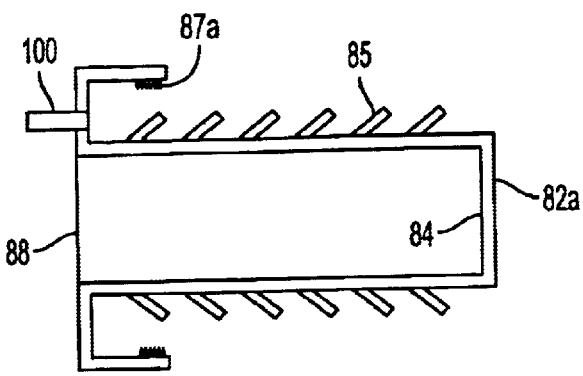
FIGS. 2A and 2B are sectional views of inner and outer tube components which make up the condenser tube and FIG. 2C is a sectional view of the assembled condenser tube.
Figure 2B:
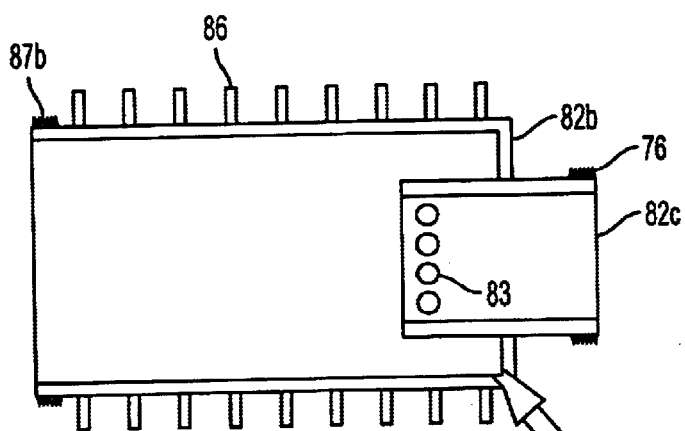
Figure 2C:
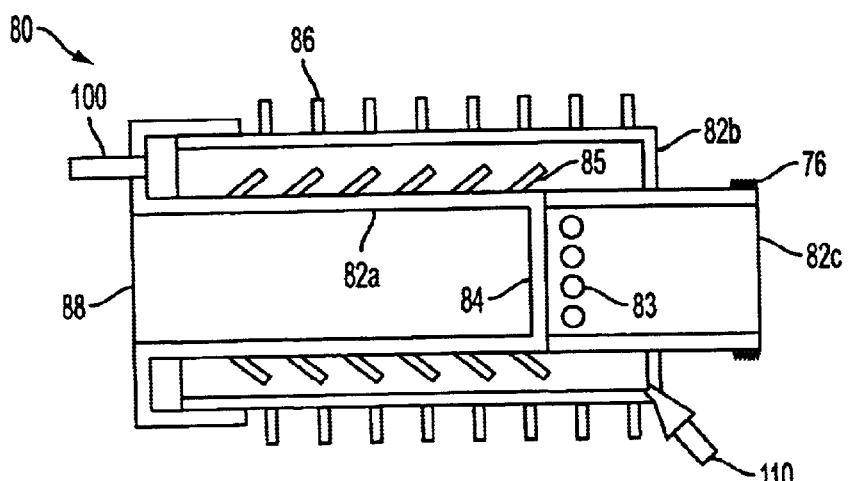

Referring now to FIG. 2, cooling fans 81 are arranged to convect cooling air through the outer cooling fins 86 and through an opening 88 provided in the inner tube component 82a. The condenser 80 has an increased cooling capacity, when compared with condensers of similar size, because its particular design permits cooling air to be directed to either side of its annular wall. A heat alarm sensor 90 is provided for purposes of emergency and/or shut-off signals.

Two outlets 100 and 110 are arranged respectively on the inner tube component 82a and the outer tube component 82b. The positions of the two outlets 100 and 110 after assembly of the inner tube component 82a to the outer tube component 82b are shown in FIG. 2C. Outlet 100 is connected to a holding tank 175 for the lower boiling waste fraction through a line for uncondensed vapor in case of fan failure. The outlet 100 provides for atmospheric pressure equilibration and for emergency overflow in case of cooling fan failure. Under normal operating conditions, all of the vapor entering the condenser 80 is condensed and exits through outlet 110. The outlet is connected with valve 120 for total reflux, valve 130 for partial reflux, valve 140 to the transition tank 145, valve 160 to a collection tank 165 for the recovery of purified distillable component, and valve 170 to the collection tank 175 for the lower boiling waste fraction.

The condenser 80 is shown in the preferred embodiment with inner and outer tube components 82a and 82b having circular cross-sections. However, the invention is not limited to such a shape. In alternative embodiments, the cross-sections can be elliptical, generally triangular or rectangular. Further, combinations of cross-sections of different shapes are possible. For example, a circular inner tube component can be engaged with a generally rectangular outer tube component. In addition, the condenser 80 is preferably made of copper or aluminum and the cooling fins 85 and 86 are preferably made of copper or aluminum.

The reflux column 60 is another one of the features of the present invention and the details thereof are illustrated in FIGS. 3, 3A, 3B, and 3C. The reflux column 60 has a housing 63, which is generally cylindrical in the preferred embodiment, but may also have elliptical, generally triangular and generally rectangular cross-sections in alternative embodiments. Within the housing 63, a plurality of flow distributors 65 and flow centralizers 67 are disposed at different axial locations. A nozzle 64 which is in communication with a reflux inlet 62 is provided at the top of the housing 63. The nozzle 64 supplies to a top flow distributor 65 the condensate which has been returned to the reflux column 60 through either the partial reflux valve 130 or the full reflux valve 120.

Figure 3A:
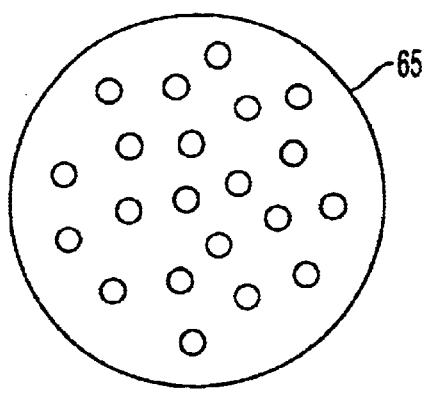
FIG. 3A is a plan view of a flow distributor housed within the reflux column.
Figure 3B:
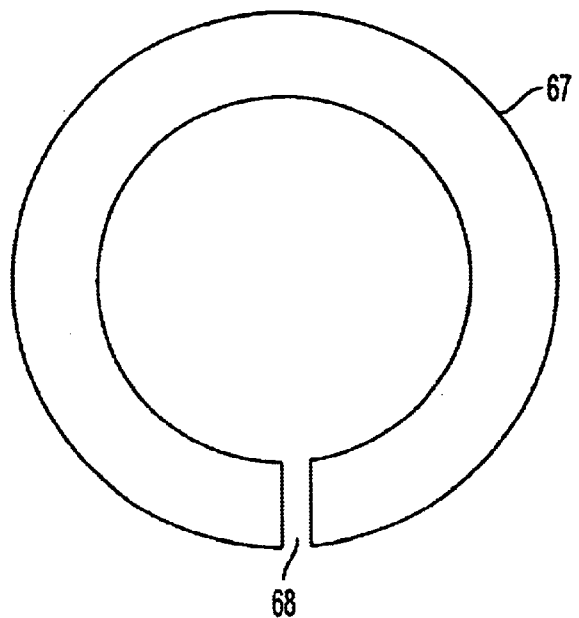
FIG. 3B is a plan view and FIG. 3C is a sectional view, both of a flow centralizer housed within the reflux column.
Figure 3C:
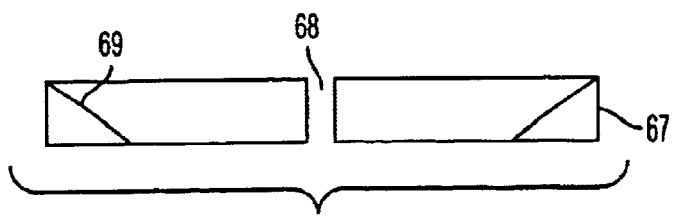

The flow distributor 65 has a plurality of holes as shown in FIG. 3A. The liquid flowing down the reflux column 60 is distributed through these holes. The flow centralizer 67 is an annular disc having a cut-off section 68 and whose wall 69 is inclined downwardly towards the disc center. The inclined wall redirects condensate flowing down the inner wall of the housing 63 towards the center portions of the housing 63. Since the rising vapors are distributed more or less uniformly throughout the housing 63, this redirection by the flow centralizer 67 improves the overall "washing" effect. The cut-off section 68 allows for easy insertion of the flow centralizer 67 into the housing 63.

Preferably, the housing 63 of the reflux column 60 is made of copper, aluminum or steel; the flow distributor 65 is made of copper, aluminum or steel; and the flow centralizer 67 is made of is made of copper, aluminum or steel.

Referring to FIG. 1, the transition tank 145 stores transition mixtures until a distillation cycle is completed. The transition tank 145 is connected with the evaporation tank 20 through valve 150. Prior to or at the beginning of the next distillation cycle, valve 150 is opened and the contents of the transition tank 145 are drained into the evaporation tank 20.

The valves 50, 120, 130, 140, 150, 160, 170, 180, and 190 are preferably solenoid valves which activate in response to control signals supplied by the control unit 400. The valves 120, 130, 140, 160, 170, 180, and 190 shown in the schematic illustration as being parallel, operate in the following manner.

When the full reflux valve 120 is opened, the other parallel valves 130, 140, 160, and 170 are closed. When the transition valve 140 is opened, the other valves 120, 130, 160, and 170 are closed. When the partial reflux valve 130 is opened, either the valve 160 or the valve 170 is also opened. The relative orifice of valve 130 is dimensioned such that approximately one-third of the condensate from the condenser 80 is routed to the reflux column 60 through the partial reflux valve 130. Approximately two-thirds of the condensate from the condenser 80 is thus routed to either the tank 165 through the valve 160 or the tank 175 through the valve 170.

Figure 4:
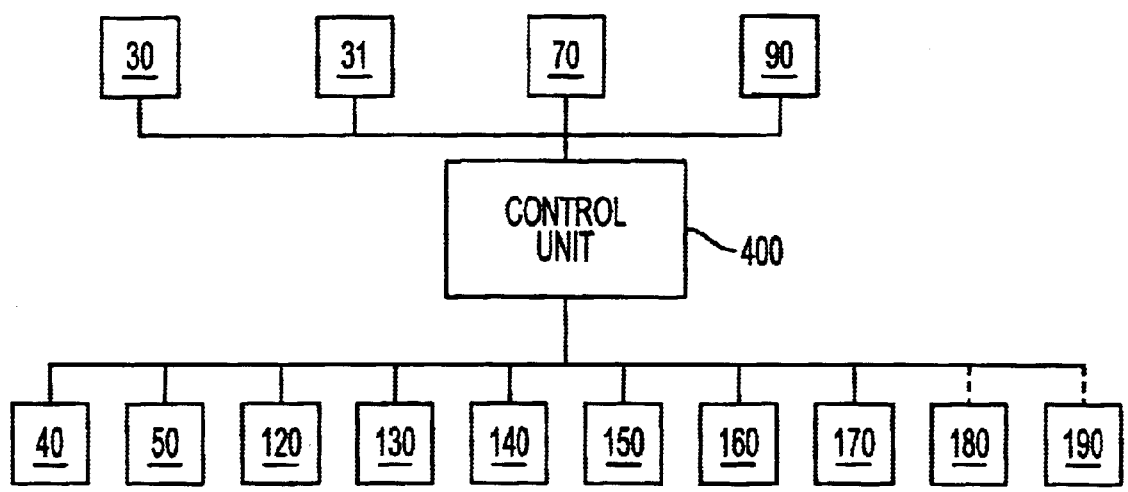
FIG. 4 is a block diagram of the control unit used in the distillation system according to the invention.
Figure 5:
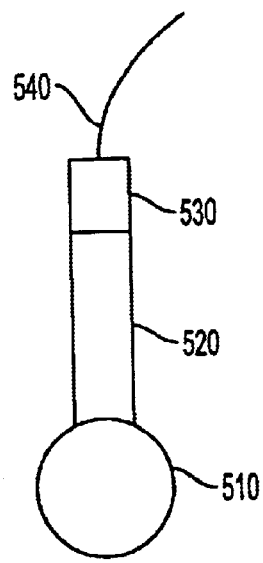
FIG. 5 is a schematic illustration of a conventional laboratory-type distillation system.
Figure 6:
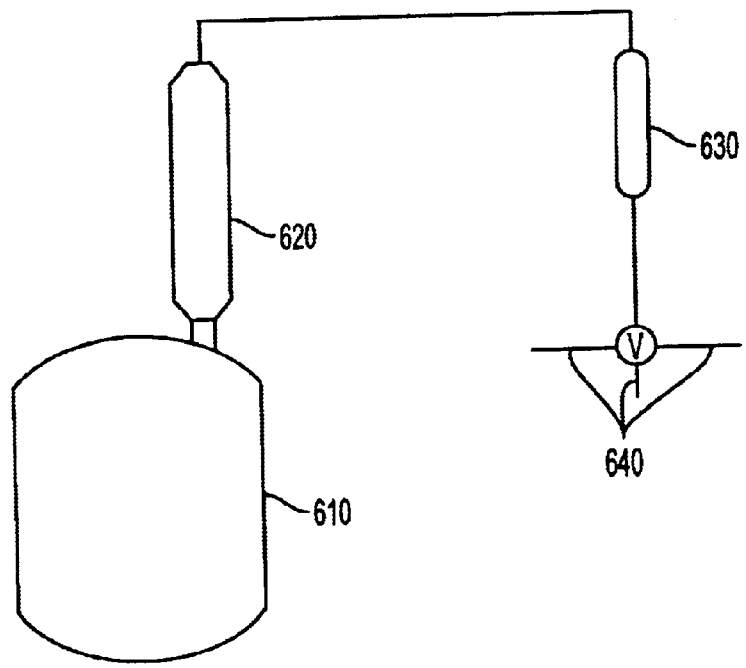
FIG. 6 is a schematic illustration of a conventional batch-type distillation system.

FIG. 4 is a block diagram of the control unit 400 used in the distillation system according to the invention. The inputs to the control unit 400 are the temperature sensors 30, 31, 70, and 90. The outputs are control signals for the heater 40 and valves 50, 120, 130, 140, 150, 160, 170, 180, and 190. The manner in which the control signals are generated is further explained below.

FIGS. 1 and 4 show in dotted lines connections to valves 180 and 190. The valves 180 and 190 and corresponding tanks 185 and 195 represent an alternative embodiment of the invention, in which multiple distillable components can be purified in a single distillation cycle using the distillation system according to the invention.

EXAMPLE 1

In Example 1, xylene is purified from used (waste) xylene mixtures, e.g., from histology laboratories. The mixture may contain xylene, ethanol, water, paraffin wax, and suspended solids. Five temperature settings are used. The mixture also may be the higher boiling waste fraction that is described in Example 2.

The following steps describe the procedures and events that are used to effect changes in the equipment operation. Table I shows the settings of the switches and valves for each step. Each column in Table I corresponds to an element which is designated by the same reference numeral in FIG. 1. In Table I, "+" refers to an "on" or "open" position, and "−" refers to an "off" or "closed" position.

Step 1. Approximately 9.4 liters of waste xylene are poured into the evaporation tank 20 and the fill cap 10 is closed.

Step 2. The "start" button is pressed. The external heater 40 is turned "on." Valve 150 is opened to drain the transition mixture stored in transition tank 145 from the previous distillation cycle into tank 20. Valve 120 remains opened to begin total reflux.

Step 3. Temperature sensor 70 records 70° C. At a temperature of 70° C., which is a few degrees below the boiling point of the lowest boiling component, the partial reflux valve 130 and the low boiling waste valve 170 are opened to begin collection of the lower boiling waste fraction. Valve 150 and the full reflux valve 120 are closed.

Step 4. Temperature sensor 70 records 82° C. At a temperature of 82° C., which is a few degrees above the boiling point of the highest boiling waste component, valves 130 and 170 are closed and the collection of the lower boiling waste fraction is stopped. Valve 140 is opened to begin collection in the transition tank 145.

Step 5. Temperature sensor 70 records 120° C. At a temperature of 120° C., which is several degrees below the boiling point of the desired solvent, xylene, valve 140 is closed and the full refluxing valve 120 is opened to begin enhancement of the purification of the xylene.

Step 6. Temperature sensor 70 records 132° C. At a temperature of 132° C., which is just a few degrees below the boiling point of xylene, the full reflux valve 120 is closed and the partial reflux valve 130 and the purified solvent valve 160 are opened to begin collection of xylene.

Step 7. Temperature sensor 30 records 180° C. At a temperature of 180° C., which is above the boiling point of xylene, valves 130 and 160 are closed to terminate collection of xylene.

Valve 140 is opened to begin collection in the transition tank 145. The heater 40 also is turned off.

Step 8. Fifteen minutes after Step 7. Valve 140 is closed and the full reflux valve 120 is opened to drain liquid residue from the column back into tank 20.

Step 9. Thirty minutes after Step 8. Valve 50 is opened to allow the high boiling waste fraction to drain into collection tank 55.

Step 10. Fifteen minutes after Step 9. Valve 50 is closed and one distillation cycle is now completed.

TABLE I

| Step | 40 | 50 | 120 | 130 | 140 | 150 | 160 | 170 |
|---|---|---|---|---|---|---|---|---|
| 1 | − | − | + | − | − | − | − | − |
| 2 | + | − | + | − | − | + | − | − |
| 3 | + | − | − | + | − | − | − | + |
| 4 | + | − | − | − | + | − | − | − |
| 5 | + | − | + | − | − | − | − | − |
| 6 | + | − | − | + | − | − | + | − |
| 7 | − | − | − | − | + | − | − | − |
| 8 | − | − | + | − | − | − | − | − |
| 9 | − | + | + | − | − | − | − | − |
| 10 | − | − | + | − | − | − | − | − |

In a typical run, waste xylene contains about 15–25% of contaminants (water, ethanol, paraffin wax and suspended solids). After purification, the recycled xylene typically contains less than 0.1 to 0.5% of contaminants. The lower boiling waste fraction contains about 1.5 to 2.5 liters of water and ethanol, and the higher boiling waste fraction contains about 0 to 20 g of wax and solids. The water-ethanol waste fraction can be recycled separately as described in Example 2 for alcohol recovery.

EXAMPLE 2

In Example 2, isopropanol is purified from used (waste) isopropanol mixtures, e.g., from histology laboratories. The mixture may contain isopropanol, water, xylene, paraffin wax and suspended solids. The mixture also may be the lower boiling waste fraction that was described in Example 1.

The following steps describe the procedures and events that are used to effect changes in the equipment operation. Table II shows the settings of the switches and valves for each step. Each column in Table II corresponds to an element which is designated by the same reference numeral in FIG. 1. In Table II, "+" refers to an "on" or "open" position, and "−" refers to an "off" or "closed" position.

Step 1. Approximately 9.4 liters of waste isopropanol are poured into the evaporation tank 20, and the fill cap 10 is closed.

Step 2. The "start" button is pressed. The external heater 40 is turned "on" and valve 120 remains opened to begin total reflux. Valve 150 is also opened to drain the transition mixture stored in transition tank 145 from the previous distillation cycle into tank 20.

Step 3. Temperature sensor 70 records 74° C. At a temperature of 74° C., which is just a few degrees below the boiling point of the desired solvent, isopropanol, the full reflux valve 120 and the transition valve 150 are closed and the partial reflux valve 130 and the purified solvent valve 160 are opened to begin collection of the purified isopropanol.

Step 4. Temperature sensor 70 records 87° C. At a temperature of 87° C., which is a few degrees above the boiling point of isopropanol, valves 130 and 160 are closed to terminate collection of isopropanol. Valve 140 is opened to begin collection in the transition tank 145, and the external heater 40 is turned off.

Step 5. Fifteen minutes after Step 4, valve 140 is closed and the full reflux valve 120 is opened to drain liquid residue from the column back into tank 20.

Step 6. Thirty minutes after Step 5, valve 50 is opened to drain the high boiling waste fraction into collection tank 55.

Step 7. Fifteen minutes after Step 6. Valve 50 is closed and one distillation cycle is now completed.

TABLE II

| Step | 40 | 50 | 120 | 130 | 140 | 150 | 160 | 170 |
|---|---|---|---|---|---|---|---|---|
| 1 | − | − | + | − | − | − | − | − |
| 2 | + | − | + | − | − | − | − | − |
| 3 | + | − | − | + | − | − | + | − |
| 4 | − | − | − | − | + | − | − | − |
| 5 | − | − | + | − | − | − | − | − |
| 6 | − | + | + | − | − | − | − | − |
| 7 | − | − | + | − | − | − | − | − |

In a typical run, the initial waste isopropanol contains about 20–30% of contaminants (water, xylene, paraffin wax and suspended solids). After purification, the recycled isopropanol typically contains less than 0.1 to 0.5% of contaminants. In this purification, there is no lower boiling waste fraction. The higher boiling waste fraction typically contains about 1.6 to 4.0 liters of mainly water containing small amounts of xylene and only trace amounts of wax and solids. After cooling, the floating xylene and paraffin can be decanted into a waste xylene container for later xylene recycling. The waste water can be discharged into a sink.

EXAMPLE 3

In Example 3, acetone is purified from used (waste) acetone mixtures, e.g., from tissue defatting operations. The mixture may contain acetone, water, acetone-soluble materials (like fats and oils), and suspended solids.

The following steps describe the procedures and events that are used to effect changes in the equipment operation. Table III shows the settings of the switches and valves for each step. Each column in Table III corresponds to an element which is designated by the same reference numeral in FIG. 1. In Table III, "+" refers to an "on" or "open" position, and "−" refers to an "off" or "closed" position.

Step 1. Approximately 9.4 liters of waste acetone are poured into the evaporation tank 20, and the fill cap 10 is closed.

Step 2. The "start" button is pressed. The external heater 40 is turned "on" and valve 120 remains opened to begin total reflux. Valve 150 is also opened to drain the transition mixture stored in transition tank 145 from the previous distillation cycle into tank 20.

Step 3. Temperature sensor 70 records 48° C. At a temperature of 48° C., which is just a few degrees below the boiling point of the desired solvent, acetone, the full reflux valve 120 and the transition valve 150 are closed and the partial reflux valve 130 and the purified solvent valve 160 are opened to begin collection of the purified acetone.

Step 4. Temperature sensor 70 records 61° C. At a temperature of 61° C., which is a few degrees above the boiling point of acetone, valves 130 and 160 are closed to terminate collection of acetone. Valve 140 is opened to begin collection in the transition tank 145, and the external heater 40 is turned off.

Step 5. Fifteen minutes after Step 4, valve 140 is closed and the full reflux valve 120 is opened to drain liquid residue from the column back into tank 20.

Step 6. Thirty minutes after Step 5, valve 50 is opened to drain the high boiling waste fraction into collection tank 55.

Step 7. Fifteen minutes after Step 6. Valve 50 is closed and one distillation cycle is now completed.

TABLE III

| Step | 40 | 50 | 120 | 130 | 140 | 150 | 160 | 170 |
|---|---|---|---|---|---|---|---|---|
| 1 | − | − | + | − | − | − | − | − |
| 2 | + | − | + | − | − | − | + | − |
| 3 | + | − | − | + | − | − | + | − |
| 4 | − | − | − | − | + | − | − | − |
| 5 | − | − | + | − | − | − | − | − |
| 6 | − | + | + | − | − | − | − | − |
| 7 | − | − | + | − | − | − | − | − |

In a typical run, the initial waste acetone contains 5–20% of contaminants (water, acetone-soluble materials and suspended solids). After purification, the recycled acetone typically contains less than 0.1 to 0.5% of contaminants. As in Example 2, there is no lower boiling waste fraction. The higher boiling waste fraction typically contains about 0.5 to 2.0 liters. After cooling, the floating oils and fats can be skimmed off for salvage or disposal, and the water portion can be discarded in a sink.

FIGS. 1 and 4 show in dotted lines connections to valves 180 and 190. The valves 180 and 190 and corresponding tanks 185 and 195 represent an alternative embodiment of the invention, in which multiple distillable components can be purified in a single distillation cycle using the distillation system according to the invention.

The dimensions of the distillation system and its major components are as follows. Overall, the system is about 40 inches high, 16 inches wide, and 26 inches deep. The condenser 80 is about 10 inches long and has a diameter of about 3 inches. The reflux column 60 is about 8 inches tall and has a diameter of about 2 inches.

While particular embodiments and examples according to the invention have been illustrated and described above, it will be clear that the invention can take a variety of forms and embodiments within the scope of the appended claims.

We claim:

1. A system for recovering through at least one distillation cycle at least one purified component from a starting mixture, said system comprising:
   an evaporation tank for evaporating of said starting mixture into vapors;
   a condenser in fluid communication with said evaporation tank for receiving said vapors from said evaporation tank and condensing them to a liquid state;
   a reflux column extending between said evaporation tank and said condenser;
   a collection tank for collecting said purified component from said condenser; and
   a transition tank connected with said evaporation tank and receiving at least one transition mixture from said condenser which has been distilled from said starting mixture during said distillation cycle and is to be supplied to said system as a part of the starting mixture used in a next distillation cycle.

2. The system according to claim 1, wherein at least one transition mixture is collected during a transition period corresponding to a temperature range occurring before a boiling point of said at least one distillable component to be purified.

3. The system according to claim 1, wherein at least one transition mixture is collected during a transition period corresponding to a temperature range occurring after a boiling point of said at least one distillable component to be purified.

4. The system according to claim 1, further comprising:
   a heater to supply heat to said evaporation tank, said heat vaporizing said starting mixture;
   wherein said transition mixture is a mixture including said at least one distillable component which results from vapors of the starting mixture that are vaporized from said evaporation tank and condensed in said condenser and collected during a transition period corresponding to a predetermined temperature range before and/or after a boiling point of said at least one distillable component to be purified.

5. The system according to claim 4, further comprising:
   at least one waste tank connected to said condenser or said evaporation tank;
   at least one purified distillable component collection tank connected to said condenser;
   at least one temperature sensor disposed between said reflux column and said condenser, said sensor monitoring a temperature of said vapors traveling from said reflux column to said condenser; and
   a plurality of valves including a waste tank valve controlling flow from said condenser to said waste tank or from said evaporation tank to said waste tank, a purified distillable component collection valve controlling flow from said condenser to said purified distillable component collection tank, a first transition valve controlling flow from said condenser to said transition tank, a second transition valve controlling flow from said transition tank to said evaporation tank, a full reflux valve controlling flow from said condenser to said reflux inlet of said reflux column, a partial reflux valve controlling flow from said condenser to said reflux inlet of said reflux column,
   wherein said plurality of valves operate in response to the temperature sensed by said at least one temperature sensor and said partial reflux valve is opened simultaneously with one of said waste tank valves or with said purified distillable component collection valve.

6. A distillation system comprising:

a heating tank holding and vaporizing a starting mixture;

a condenser receiving vapors of said starting mixture and condensing said vapors to a condensate, said condenser including a base opening through which said vapors are supplied and an outer wall section being in fluid communication with said base opening which defines an inner receiving area for the vapors after entering through said base opening, said inner receiving area being at least partially blocked with an inner wall section which forces the vapors to travel in the receiving area between the outer wall section and the inner wall section, said inner wall section being hollow to allow cooling air to enter and cool the inner wall section; and a purified distillable component tank collecting therein the condensate from said condenser.

7. The system according to claim 6, further comprising inner fins arranged along the outer and/or inner wall sections that contact the vapors.

8. The system according to claim 7, wherein the inner fins are helically arranged.

9. The system according to claim 6, wherein said condenser further includes at least one cooling fin disposed along an outer periphery of the outer wall section.

10. The system according to claim 6, wherein said condenser includes a condensate outlet port arranged at a lowest portion of said condenser.

* * * * *